United States Patent
Covini

(10) Patent No.: US 10,889,094 B2
(45) Date of Patent: Jan. 12, 2021

(54) METHOD FOR MAKING A THIN PADDING FROM STABILIZED FIBERS, FOR CLOTHING ARTICLES, QUILTS AND SLEEPING BAGS

(71) Applicant: FISI FIBRE SINTETICHE S.P.A., Oggiono (IT)

(72) Inventor: Tranquilla Covini, Oggiono (IT)

(73) Assignee: FISI FIBRE SINTETICHE S.P.A., Oggiono (IT)

( * ) Notice: Subject to any disclaimer, the term of this patent is extended or adjusted under 35 U.S.C. 154(b) by 239 days.

(21) Appl. No.: 14/647,077

(22) PCT Filed: Nov. 25, 2013

(86) PCT No.: PCT/IB2013/002632
§ 371 (c)(1),
(2) Date: May 22, 2015

(87) PCT Pub. No.: WO2014/080273
PCT Pub. Date: May 30, 2014

(65) Prior Publication Data
US 2015/0298445 A1   Oct. 22, 2015

(30) Foreign Application Priority Data

Nov. 26, 2012   (IT) .............................. MI2012A2000

(51) Int. Cl.
*B32B 37/06* (2006.01)
*D04H 1/542* (2012.01)
(Continued)

(52) U.S. Cl.
CPC .............. *B32B 37/06* (2013.01); *D04H 1/02* (2013.01); *D04H 1/542* (2013.01); *D04H 1/655* (2013.01);
(Continued)

(58) Field of Classification Search
CPC . B32B 37/06; B32B 2310/00; B32B 2305/18; B32B 2398/20; D04H 1/542;
(Continued)

(56) References Cited

U.S. PATENT DOCUMENTS 3,323,959 A * 6/1967 Kreckl ...................... B32B 5/26
156/155
4,273,981 A * 6/1981 Nopper ................. F26B 13/101
219/388
(Continued)

FOREIGN PATENT DOCUMENTS

| EP | 0365491 A2 | 4/1990 |
| GB | 1397665 A | 6/1975 |

(Continued)

OTHER PUBLICATIONS

"Handbook of Nonwovens", Woodhead Publishing, 2007, pp. 391, ISBN 9781855736030, ttps://doi.org/10.1533/9781845691998.368, (http://www.sciencedirect.com/science/article/pii/B9781855 (Year: 2007).*

(Continued)

*Primary Examiner* — Vishal I Patel
(74) *Attorney, Agent, or Firm* — Hedman & Costigan, P.C.; James V. Costigan; Kathleen A. Costigan

(57) ABSTRACT

A method for making a thin padding from stabilized fibers, for clothing articles, quilts and sleeping bags, having the steps of: providing a synthetic fiber lap; processing the synthetic fiber lap by spreading thermoplastic resins on a surface of the synthetic fiber lap; recovering excess thermoplastic resins from the processing step where thermoplastic resins are spread, recycling the excess thermoplastic resin in another processing step where thermoplastic resins are spread; heating said thermoplastic resins and said lap syn- (Continued)

thetic fibers; and reducing a thickness of said lap and smoothing the synthetic resin lap to provide a thin padding.

4 Claims, 3 Drawing Sheets

(51) Int. Cl.
  *D04H 1/68* (2012.01)
  *D04H 1/655* (2012.01)
  *D04H 1/732* (2012.01)
  *D04H 1/02* (2006.01)

(52) U.S. Cl.
  CPC ............... *D04H 1/68* (2013.01); *D04H 1/732* (2013.01); *B32B 2305/18* (2013.01); *B32B 2310/00* (2013.01); *B32B 2398/20* (2013.01)

(58) Field of Classification Search
  CPC ........... D04H 1/68; D04H 1/02; D04H 1/655; D04H 1/732
  See application file for complete search history.

(56) References Cited

U.S. PATENT DOCUMENTS

| | | | |
|---|---|---|---|
| 4,693,913 A * | 9/1987 | Gessner | B29B 15/127 427/215 |
| 4,966,801 A * | 10/1990 | Becker | B29C 70/22 428/113 |
| 5,316,601 A * | 5/1994 | Hebbard | A61F 13/15617 156/543 |
| 5,593,746 A * | 1/1997 | Siniscalchi | D04H 1/643 19/98 |
| 5,873,964 A | 2/1999 | Kwok | |
| 2003/0198797 A1 * | 10/2003 | LeBoeuf | A47J 47/005 428/297.4 |
| 2006/0144012 A1 * | 7/2006 | Manning | B32B 5/02 52/782.1 |
| 2010/0199406 A1 * | 8/2010 | Dua | A43B 1/04 2/115 |
| 2015/0145166 A1 * | 5/2015 | Seils | D04H 1/655 264/257 |

FOREIGN PATENT DOCUMENTS

| | | | | |
|---|---|---|---|---|
| JP | 2006-063508 A | | 3/2006 | |
| WO | WO 2013167356 A1 * | | 11/2013 | ............. D04H 1/655 |

OTHER PUBLICATIONS

JP 2006-063508A machine English translation of claims.
JP 2006-063508A machine English translation of description.
International Search Report in PCT/IB2013/002632, dated Feb. 12, 2014.
International Preliminary Report on Patentability PCT/IB2013/002632, 13 pages, dated Apr. 7, 2015.

* cited by examiner

METHOD FOR MAKING A THIN PADDING FROM STABILIZED FIBERS, FOR CLOTHING ARTICLES, QUILTS AND SLEEPING BAGS

BACKGROUND OF THE INVENTION

The present invention relates to a method for making a thin padding from stabilized fibers, for clothing articles, quilts and sleeping bags.

As is known, for making sports or winter clothing article paddings, needled waddings are conventionally used.

However, the needling process is very expensive and does not provide the clothing articles thus made with satisfactory compactness and does not prevent the fabric fibers from ragging from the fabric.

Moreover, because of the high wadding bulkiness, the clothing or garment articles made thereby have poor aesthetic characteristics.

In addition, the needled wadding does not have high thermal insulating characteristics, unless it is made with a comparatively great thickness.

Because of the above drawbacks, conventional cloth article waddings, even in a needled condition, have not been broadly used so far for making overcoats, winter sport garments and jackets, boots, shoes, quilts and the like.

Another problem related to the synthetic padding making systems is that it is necessary to use therein a comparatively large amount of synthetic raw material, with consequent great waste problems.

Furthermore, prior padding or wadding making methods are very expensive from an energy consumption standpoint.

It is also known that, at present, for making wadding materials, a lot of different machines, such as cards and lap making apparatuses, are conventionally used.

SUMMARY OF THE INVENTION

Accordingly, the aim of the present invention is to provide a novel method for making a stabilized fiber thin padding material, for use in particular in the cloth article field and for making quilts and sleeping bags, overcoming the above mentioned prior art drawbacks.

Within the scope of the above mentioned aim, a main object of the invention is to provide such a method allowing to use, as a raw or starting material, a recycled plastics material and any kind of fibers, either of natural or synthetic type.

Another object of the present invention is to provide such a method allowing to greatly reduce the resin amount coated on the article surface.

Yet another object of the present invention is to provide such a method allowing to greatly reduce the machine types for making the padding, by eliminating, for example, carding and lap making apparatuses.

Yet another object of the present invention is to provide such a method providing padding materials having simultaneously the desired thickness, lightness, washing and wearing mechanical strength features.

Yet another object of the present invention is to provide such a method for making a padding material having a high resistance against deformations, even under high mechanical or water or dry washing stress.

Yet another object of the present invention is to provide such a method allowing to make stabilized surface fibers so arranged as not to project upon use from the fabric materials.

Yet another object of the present invention is to provide such a method which, owing to its specifically designed method features, is very reliable and safe in operation.

According to one aspect of the present invention, the above mentioned aim and objects, as well as yet other objects, which will become more apparent hereinafter, are achieved by a method for making a thin padding from stabilized fibers, for clothing articles, quilts and sleeping bags, characterized in that said method comprises the steps of:

providing a synthetic fiber lap;
resin processing said synthetic fiber lap by thermoplastic resins spread on a surface of said lap;
recovering said resins spread in said resin application step for reusing said resins in another resin processing step;
heating said thermoplastic resins and said lap synthetic fibers;
reducing a thickness of said lap and smoothing said lap to provide a thin padding.

BRIEF DESCRIPTION OF THE DRAWINGS

Further characteristics and advantages of the present invention will become more apparent hereinafter from the following disclosure of a preferred, though not exclusive, embodiment of the invention which is illustrated, by way of an indicative but not limitative example, in the accompanying drawings, where.

DESCRIPTION OF THE PREFERRED EMBODIMENTS

With reference to the number references of the above mentioned figures, the method for making a stabilized fiber thin padding according to the present invention comprises the step of providing a lap 1, made by mixing recycled fibers and/or polyester and/or synthetic and/or natural fibers and/or thermoforming glue materials.

To reduce the amount of resin coated on the product surface, the inventive method advantageously comprises the step of mixing recycled fibers and thermobonding fibers.

The latter allow to bind the padding in its inside and reduce by 40% the amount of resin used on the padding surface, with respect to prior systems.

Figure 1:
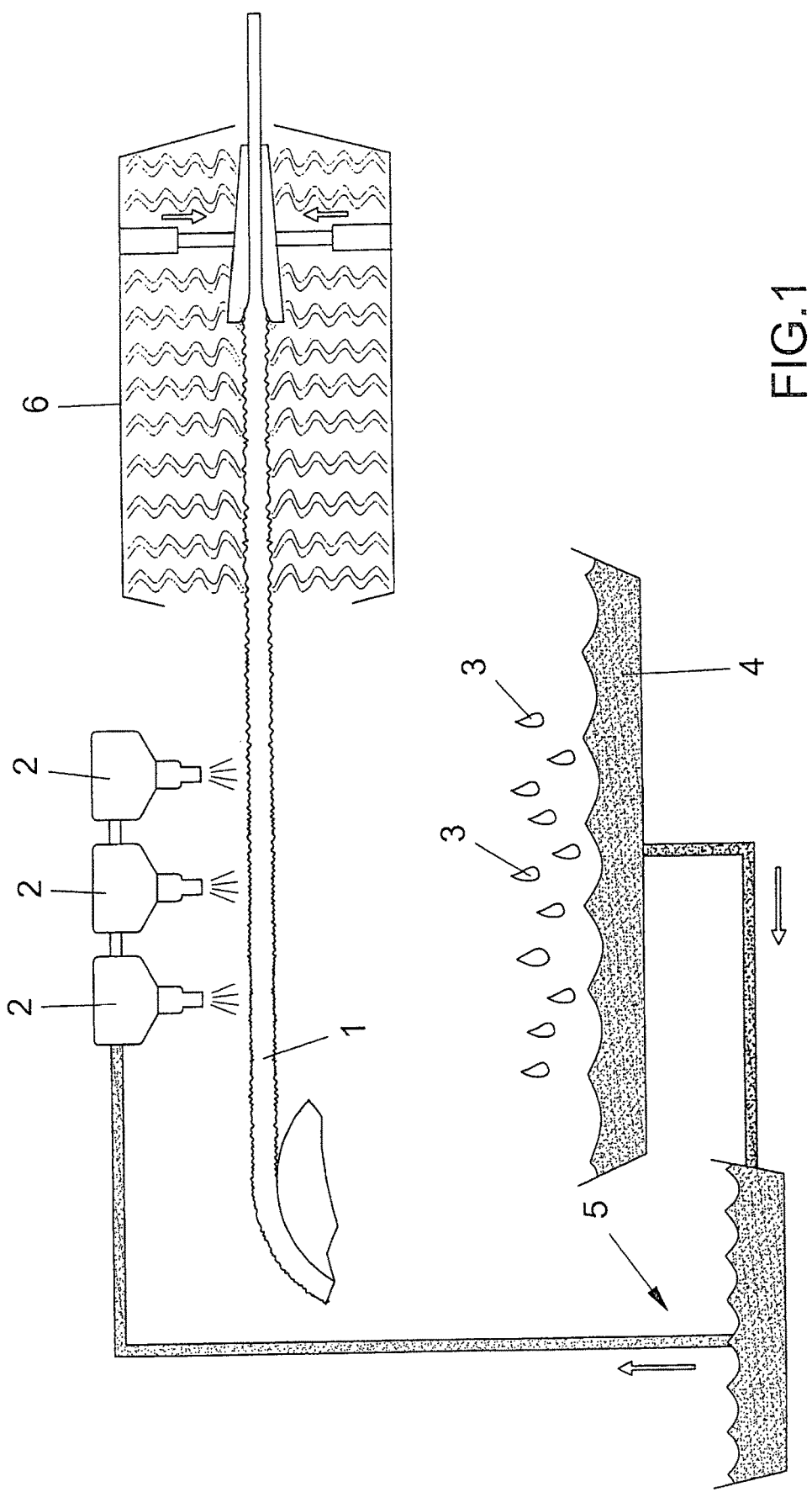
FIG. 1 schematically shows a finishing system for making a stabilized fiber to thin padding according to the inventive method.

The resin applying step is carried out, as shown in FIG. 1, by using spraying elements 2.

According to the present invention, the resin 3, spread in said spraying step, is collected in collecting basins 4 and reused in a resin recirculating circuit 5 having a specifically designed construction.

After said resin applying step, the lap 1 is conveyed through an oven 6, heated by an IR radiation, for crosslinking said resins and actuating said thermobonding fibers.

Since said resin is sprayed only on the wadding surface, the fibers being bound by the thermobonding fibers, the drying time is shorter than that of prior methods, with a smaller power consumption.

Figure 2:
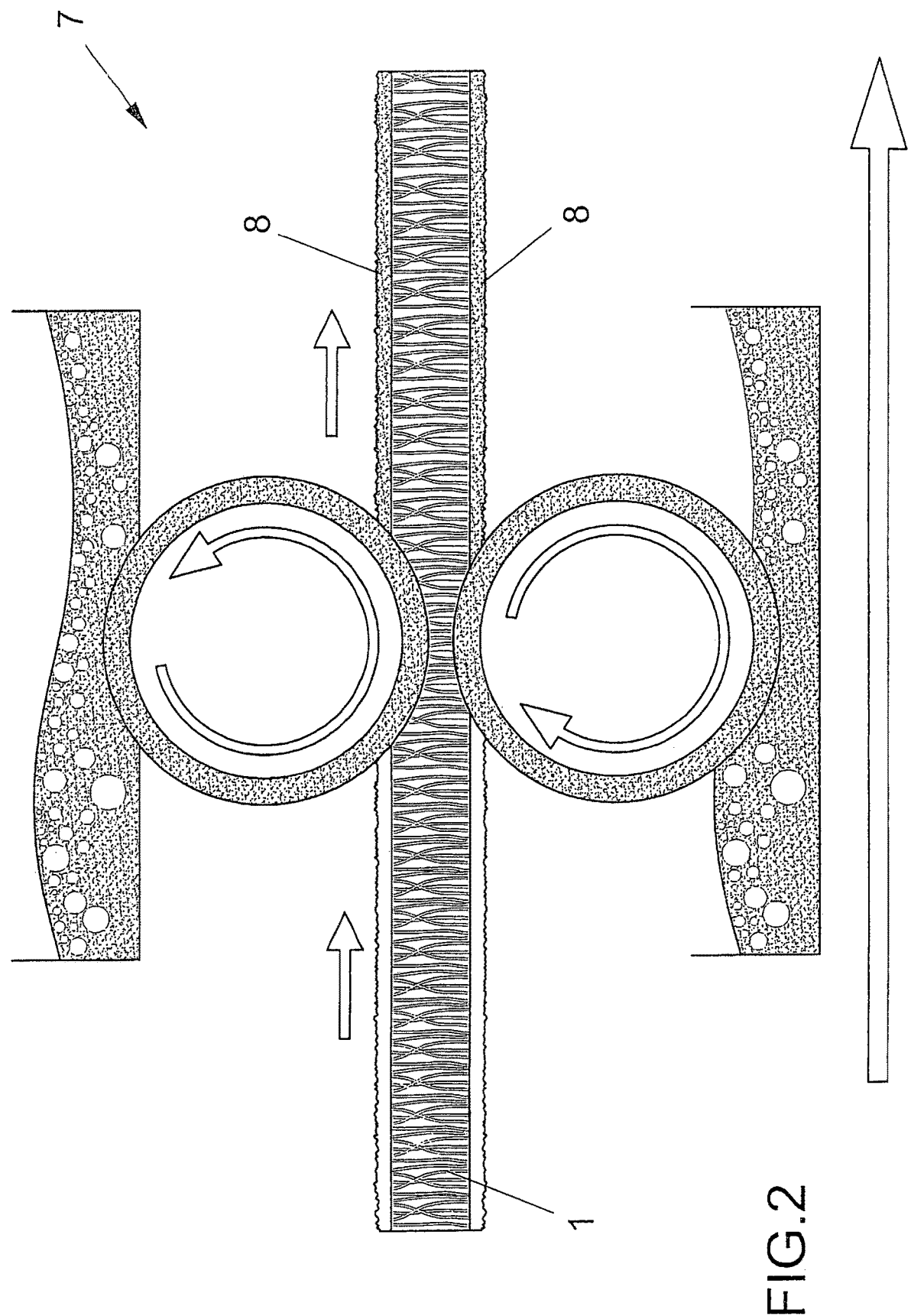
FIG. 2 is an enlarged side elevation view showing a synthetic fiber lap, being subjected to a resin coating and calendering process by a foaming machine.
Figure 3:
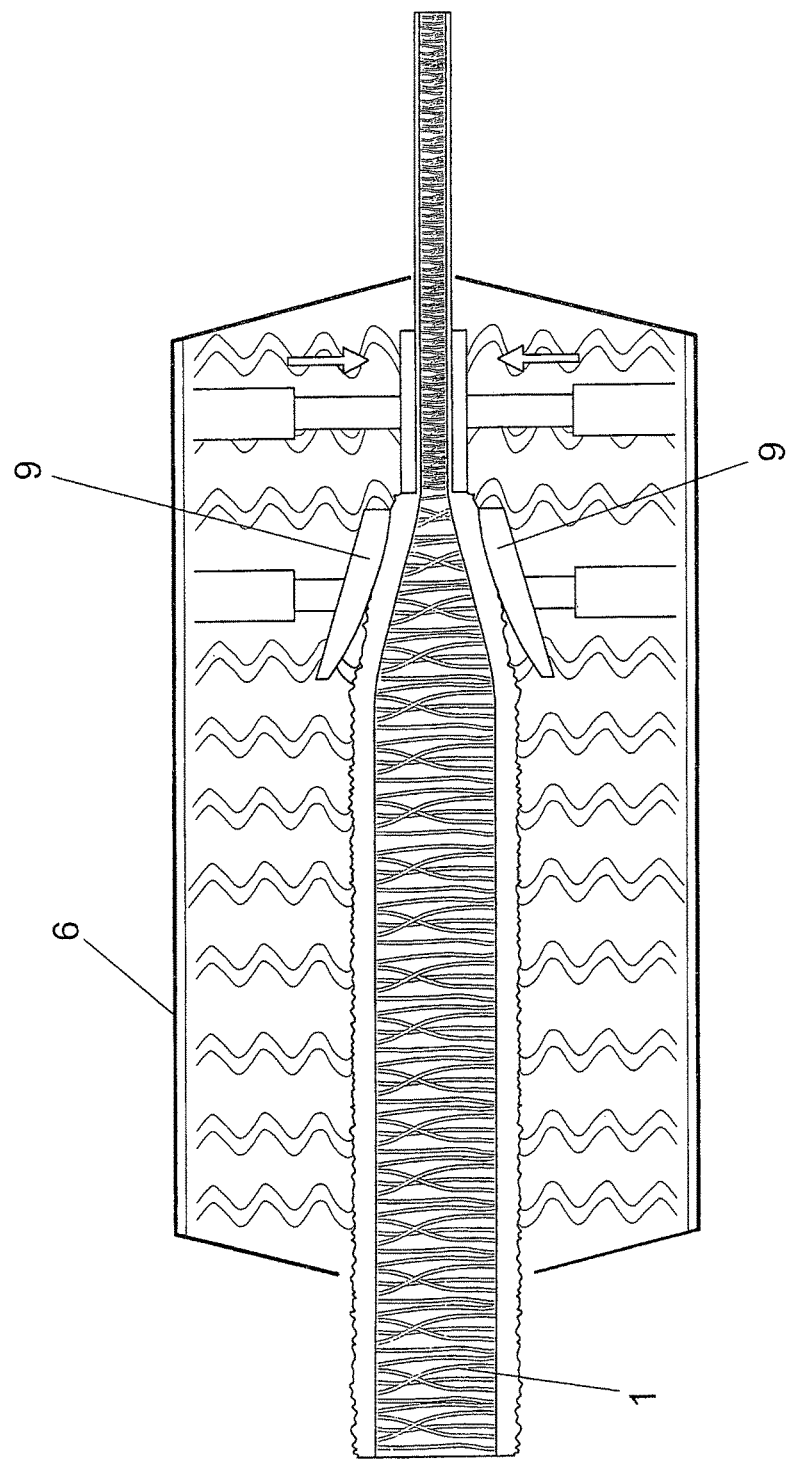
FIG. 3 is a schematic view showing a system for reducing the thickness is and smoothing the wadding surface, by adjustable steel plates.

According to another embodiment of the inventive method, a specifically designed foaming machine 7, schematically shown in FIG. 2, is used.

After having made the wadding, with either recycled or non recycled fibers, and containing thermobonding fibers, it is possible to further use, alternatively to the to resin applying step, the above mentioned foaming machine.

In particular, said resin foaming machine 7 deposits a thin web 8, of about 3-5 grams, either on one or both the faces of said lap, said thin web being constituted by a finishing resin material, thereby saving about 60% of resin.

The product thus made is then cross-linked in a small cross-linking oven 6, of about 3-5 m, being heated by an IR radiation, with a great power saving in comparison with prior systems.

In this connection, it should be pointed out that up to now the resin was mixed with water in order to be applied by spraying.

According to the invention, only a resin dispersion which may be a vinyl, acryl, polyurethane, styrene, natural or the like resin is used, with a great energy saving as to the drying thereof.

According to a further aspect of the present invention, for reducing the wadding thickness and smoothing the wadding surface, two adjustable steel plates 9 arranged in the oven 6 are used, said plates exploiting the heat emitted in a drying step for providing a calendering effect.

According to a further aspect of the present invention, to further reduce the wadding making cost, instead of conventional machines, such as carding and lap making machines, a plurality of highly ventilated modified balebreakers, operating on said fibers are herein used.

The high bulkiness and randomly arranged fibers thus opened are pneumatically transported to a silo and again stirred by highly ventilated air.

Said silo having an adjustable outlet for stabilizing the fiber material amount and thickness.

The randomized fiber carpet thus formed is deposited on a suitable conveyor belt for conveying to further processing operating steps.

Then, the finishing step is carried out by the above disclosed methods.

The wadding making method carried out by the above disclosed system provides a number of advantages.

At first, about 80% of the textile machines, in particular carding and lap making machines, are eliminated.

A further advantage is that the different type and nature fibers, either in a mixed or non-mixed condition, are not arranged parallel to one another but with a random arrangement, thereby increasing the wadding volume, which will be much larger than that of a like weight conventional wadding material, with a consequent thermal insulation improvement (as known, air is the best thermally insulating material).

It has been found that the invention fully achieves the intended aim and objects.

In fact, the invention has provided a method for making a thermally insulating material layer, having a very little thickness while including, on the two main surfaces thereof, a perspiring film or mesh construction.

The end product, in particular, is a lap including synthetic fibers covered or resin coated by a thermomelting, glue material mixture, having very satisfactory size and structural stability properties, thereby the thermoinsulating material layer has a very high wear and mechanical stress resistance, as well as a related dry or wet washing resistance.

In fact, a number of outer synthetic fibers are partially thermomelt and firmly glued with one another, thereby preventing the elementary fibers forming the fiber lap from ragging and separating from one another and projecting from the fabric material.

Thus, very stabilized non ragging fibrous material layers are achieved, which have a great resistance against high surface stresses.

In this connection it should be pointed out that the partial and surface thermomelting of the synthetic fibers constituting the target thickness lap may occur either on one or both the inventive padding material surfaces.

A further important advantage of the present invention is that it provides the possibility of making, starting from plastics waste materials, a wadding having thermally insulating, softness and washing resistance properties comparable to those of virgin fibers.

To reduce the resin amount coated on the product surface, the recycled fibers are mixed with the mentioned thermobonding fibers allowing to bind the wadding in its inside and to reduce by 40% the resin amount coated on the fiber surfaces in comparison with prior systems.

Yet another important advantage of the present invention is that the resin dispersed in the spraying step is collected in dedicated basins and reused through a recirculating circuit.

Moreover, since the resin is sprayed only on the wadding or padding surface, whereas the inside of the fibers is bound by said thermobonding fibers, the drying time will be shorter than that of prior systems.

Yet another advantage derives from the use of the above mentioned specifically designed foaming machine, as an alternative to the spraying system, allowing to deposit a thin finishing resin web, with a consequent 60% resin saving in comparison with prior systems.

Moreover, the oven cross-linking allows to achieve a great power saving in comparison with conventional systems.

In this connection, it is stressed again that up to now resin was mixed with water to be applied by spraying, whereas, according to the present invention, only a resin dispersion which may of a vinyl, acryl, polyurethane, styrene, natural or the like type is used, with a great drying power saving.

Yet another important advantage, providing a further great economic saving, is that the lap is made without using carding and lap making machines, but by a system comprising suitably modified highly ventilated balebreakers.

The advantages comprise an elimination of 80% of the textile machines, in comparison with prior systems, and the possibility of making different type and nature fibers, either mixed or not, with a non-parallel but a random arrangement, thereby providing a padding or wadding having an improved bulkiness, in comparison with a like weight prior padding, and having improved thermal insulating properties.

In practicing the invention, the used materials, as well as the contingent size and shapes can be any, according to requirements.

The invention claimed is:

1. A method for making a padding from stabilized synthetic fibers, for clothing articles, quilts and sleeping bags, said method comprising:
   providing a synthetic fiber lap having opposed surfaces by mixing synthetic recycled fibers with thermobonding fibers, wherein all said synthetic recycled fibers and said thermobonding fibers are in a mutually mixed and random arrangement throughout said synthetic fiber lap;
   conveying said synthetic fiber lap;
   applying a liquid thermoplastic resin on only said opposed surfaces of said synthetic fiber lap simultaneously while said synthetic fiber lap is being conveyed, said liquid thermoplastic resin being a dispersion of a resin selected from vinyl, acryl, polyurethane, styrene and natural resins;

recovering excess thermoplastic resin of said liquid thermoplastic resin applied during said step of applying said liquid thermoplastic resin and recycling said excess thermoplastic resin and applying said excess thermoplastic resin in said step of applying said liquid thermoplastic resin to form a thermoplastic resin coated synthetic fiber lap;

conveying said thermoplastic resin coated synthetic fiber lap simultaneously during said step of conveying said synthetic fiber lap;

providing an oven adapted to heat said thermoplastic resin coated synthetic fiber lap by IR radiation;

arranging a pair of adjustable steel plates inside said oven;

heating said thermoplastic resin coated synthetic fiber lap simultaneously during said step of conveying said thermoplastic resin coated synthetic fiber lap by continuously conveying said thermoplastic resin coated synthetic fiber lap through said oven and simultaneously continuously conveying said thermoplastic resin coated synthetic fiber lap between said steel plates arranged inside said oven; and reducing a thickness of said thermoplastic resin coated synthetic fiber lap and smoothing said opposed surfaces of said thermoplastic resin coated synthetic fiber lap while said thermoplastic resin coated synthetic fiber lap is being simultaneously continuously conveyed through said oven and between said steel plates and simultaneously heated by IR radiation to cross-link said thermoplastic resin in a drying step to provide a calendering effect on said thermoplastic resin coated synthetic fiber lap and thereby making said padding.

2. A method, according to claim 1, wherein said thermoplastic resin is applied as a foam by a resin foaming machine.

3. A method, according to claim 2, wherein said resin foaming machine deposits a web of a finishing resin on said opposed surfaces of said synthetic fiber lap.

4. A method, according to claim 1, wherein said step of providing said synthetic fiber lap comprises applying a plurality of highly ventilated modified balebreakers to synthetic fibers, to convert said synthetic fibers to an open, high bulkiness and random condition before said synthetic fibers are pneumatically transported to a silo where said synthetic fibers are stirred by highly ventilated air, said silo having an adjustable outlet for controlling output of synthetic fiber material in an amount and a thickness to deposit a randomized fiber carpet on a conveyor belt, where it is coated with said thermoplastic resin.

* * * * *